United States Patent [19]

Ohbori et al.

[11] 4,183,032

[45] Jan. 8, 1980

[54] ELECTROSTATIC RECORDING MEDIUM WITH ELONGATED CONDUCTIVE SEGMENTS

[75] Inventors: Tamio Ohbori, Yokohama; Fuyuhiko Matsumoto; Satoru Tomita, both of Tokyo, all of Japan

[73] Assignee: Ricoh Co., Ltd., Japan

[21] Appl. No.: 868,741

[22] Filed: Jan. 12, 1978

[30] Foreign Application Priority Data

Jan. 12, 1977 [JP] Japan .................................. 52-1425
May 11, 1977 [JP] Japan .................................. 52-53233

[51] Int. Cl.$^2$ ..................... G01D 15/06; G03G 15/044
[52] U.S. Cl. ..................................... 346/155; 346/154
[58] Field of Search ................. 346/154, 153, 162, 163

[56] References Cited

U.S. PATENT DOCUMENTS

| | | | |
|---|---|---|---|
| 2,955,894 | 10/1960 | Epstein | 346/154 |
| 3,289,209 | 11/1966 | Schwertz | 346/153 |
| 3,437,408 | 4/1969 | Kazan | 346/153 |
| 3,469,028 | 9/1969 | Yamamoto | 346/154 |
| 3,665,100 | 5/1972 | Pinkham | 346/154 |
| 4,005,436 | 1/1977 | Kleinknecht | 346/154 |

FOREIGN PATENT DOCUMENTS 1107705 5/1961 Fed. Rep. of Germany ........... 346/154

Primary Examiner—Jay P. Lucas
Attorney, Agent, or Firm—McGlew and Tuttle

[57] ABSTRACT

An electrostatic recording medium having an insulating base, a conductive layer on the base, and a dielectric layer on the conductive layer. The conductive layer is divided into a plurality of segments arranged in a direction in which recording electrodes are aligned with each other, so that when associated electrodes of all the arrays of recording electrodes on one side of the recording medium are selected in common with each other and one of complementary electrodes on the other side of the recording medium is selected, a discharge occurs only in the recording electrode disposed above the selected complementary electrode. Each conductive layer segment is formed with at least one conductive portion extending through the insulating resin base and apable of coming into contact with one of the complementary electrodes. An intermediate resistance layer may be provided between the conductive layer and the dielectric layer for preventing the formation of a short circuit through the dielectric layer due to the existance of pin-holes or other defects.

12 Claims, 6 Drawing Figures

ELECTROSTATIC RECORDING MEDIUM WITH ELONGATED CONDUCTIVE SEGMENTS

BACKGROUND OF THE INVENTION

1. Field of the Invention

This invention relates to electrostatic recording apparatus of the duplex control type, for passing a recording medium between recording electrodes and complementary electrodes for electrically charging selected regions of a dielectric layer of the recording medium, and more particularly to a novel recording medium of such apparatus.

2. Description of the Prior Art

Heretofore, in this electrostatic recording apparatus, it has been customary to arrange recording electrodes N of the pin electrode type in arrays of n in number (n is a positive integer), and complementary electrodes G disposed adjacent the recording electrodes N are also arranged as complementary electrodes $G_1$, $G_2$...$G_2$ which are respectively juxtaposed against the corresponding arrays of recording electrodes N as shown in FIG. 1. Electrodes of an ordinal number j (j=1, 2, 3 .. . m) of all the arrays of recording electrodes N are connected to switches $Z_j$ of an ordinal number j. In operation of the switches Z and one of switches $K_1$, $K_2$ ... $K_n$ of the complementary electrodes G are selectively opened and closed. For example, if switches $Z_1$ and $K_2$ are selected, then an electric field of strength sufficiently high to produce a discharge is created between the electrodes (electrodes $N_{21}$ and $G_2$) to which voltages are simultaneously applied through the two switches and a discharge takes place therebetween. The art of applying a voltage or impulse to the recording medium from both sides thereof in this way for simplifying selective control of the recording electrodes N in the form of pin electrodes is known from Japanese Patent Publication No. 24642/73, for example.

Generally, the recording medium 1 may be formed by providing a conductive layer on one side or on both sides of a base which may be paper, and by providing a dielectric layer thereon by applying silicone resin, vinyl acetate resin, vinyl chloride resin, etc. Alternatively, a base formed of paper or an insulating resin plate may be made to contain minuscle particles of metal, a surface activator, or other conductive material so as to render the base itself electrically conductive. A dielectric layer may then be formed on the base functioning coextensive with the conductive layer. The recording medium shown in FIG. 1 includes a conductive support 2 formed by applying an electrically conductive material to paper or other suitable support material or impregnating such support material with an electrically conductive material, and a dielectric layer 3 formed on the conductive support. Thus is switches $K_1$ and $Z_1$ are selected, for example, then a discharge will occur between the electrodes $N_{11}$ and $G_1$ as desired, but a discharge of less intensity will also occur between an electrode $N_{21}$ of the adjacent array of recording electrodes and the complementary electrode $G_1$. This will cause a portion of the dielectric layer of the recording medium which is disposed beneath the recording electrode $N_{21}$ to be charged, with the result that what is referred to as a ghost image will be produced in the recorded likeness of the original. To obviate this defect, proposals have been made to provide improvements in the arrangement of electrodes or in control systems. However, there has hitherto been no satisfactory solution proposed to solve this problem. A difficulty has been experienced in the proir art particularly when an attempt is made to carry out recording in an atmosphere of high humidity.

SUMMARY OF THE INVENTION

This invention has as its object the provision of an electrostatic recording medium of the dual control type of electrostatic recording apparatus which is free from the formation of a ghost image in the recorded likeness of the original.

Another object of the present invention is to provide an electrostatic recording medium which can be repeatably used in an electrostatic recording system of the toner image transfer printing type.

The present invention is based on the discovery that the occurrence of a ghost image phenomenon is attributed to the fact that, since the conductive base 2 of the recording medium 1 is continuous and forms an entity by itself, a portion of the conductive base 2 disposed above the complementary electrode $G_2$ is influenced by the voltage applied to the complementary electrode $G_1$ when a discharge takes place between the electrodes $N_{11}$ and $G_1$, and the portion of the conductive base 2 juxtaposed against the complementary electrode $G_2$ behaves as if a voltage were applied thereto. This is supported by the fact that a ghost image phenomenon tends to occur more readily when electrostatic recording is carried out in an atmosphere of high humidity in which the conductivity of a conductive support generally shows an increase.

In one preferred embodiment, the electrostatic recording medium according to the invention has a conductive layer interposed between an insulating base and a dielectric layer, the conductive layer being divided into a plurality of segments arranged in a direction in which recording electrodes are aligned with each other. Each of the conductive layer segments is formed with at least one conductive member extending through the insulating base and exposed to the underside of the base, so that the conductive member of each conductive layer segment will come into contact with a corresponding complementary electrode. Thus the conductive layer is divided into segments arranged in the direction in which the recording electrodes are aligned with each other, so that interference which would otherwise occur between the adjacent arrays of recording electrodes can be avoided. This has the effect of eliminating the ghost image phenomenon.

In another preferred embodiment of the invention, an intermediate resistance layer is provided between the conductive layer and the dielectric layer of the electrostatic recording medium in order to prevent the formation of a short circuit extending through the dielectric layer which would be the case if pin-holes or other defects existed in the dielectric layer of the electrostatic recording medium. If a short circuit occurs, recording will not be carried out satisfactorily when the latent image formed on the recording medium is developed by means of a toner. A white spot or spots to which no toner adheres will exist in the recorded likeness of the original. It will thus be impossible to produce an acceptable recording. The provision of the intermediate resistance layer eliminates the influence which would otherwise be exerted by variations in the skill with which the dielectric layer is provided, which affects the ruality of the recorded likeness of the original produced by electrostatic recording. Accordingly, an object of the present invention is to provide an electrostatic recording medium for an electrostatic recording apparatus having a plurality of recording electrodes arranged into a plurality of recording arrays, wherein one recording electrode from each recording electrode array is connected in common to one of a plurality of common switches and each recording electrode array is associated with a complementary electrode for recording an impulse on the recording medium when the impulse is selectively applied to one of the common switches and one associated complementary electrode comprising, an insulating base, a plurality of conductive layer segments on the insulating base, each associatable with at least one of the arrays and with its associated complementary electrode wherein the conductive segments are spaced apart and electrically separated from each other on the base, for recording the impulse on the recording medium only in the vicinity of the complementary electrode selected, and a dielectric layer on the insulating base overlaying the conductive layer segments.

The various features of novelty which characterize the invention are pointed out with particularity in the claims annexed to and forming a part of this disclosure. For a better understanding of the invention, its operating advantages and specific objects attained by its use, reference should be made to the accompanying drawings and descriptive matter in which there are illustrated preferred embodiments of the invention.

DESCRIPTION OF THE PREFERRED EMBODIMENTS

Figure 2:
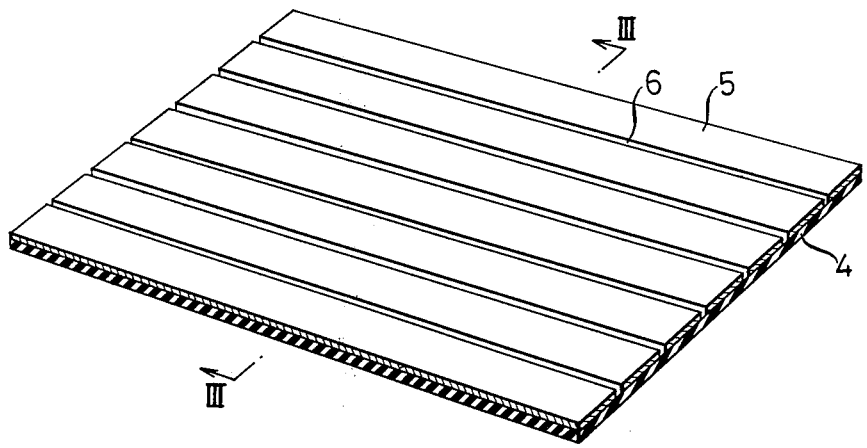
FIG. 2 is a fragmentary perspective view of the conductive support of the electrostatic recording medium in accordance with the present invention.
Figure 3:
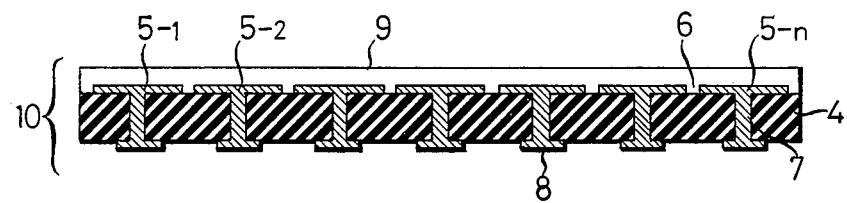
FIG. 3 is a diagrammatic showing of the electrostatic recording medium comprising one embodiment of the invention, shown in a sectional view taken along the line III—III in FIG. 2 with a dielectric layer being provided on the conductive support shown in FIG. 2.

A first embodiment of the invention will be described by referring to FIG. 2 to 4. FIG. 2 shows a conductive support of a recording medium 10 in accordance with the invention which has an insulating resin base 4 and a conductive layer 5 on the base 4. By providing a dielectric layer 9 on the conductive layer 5 as shown in FIG. 3, it is possible to obtain the recording medium 10. The conductive layer 5 is divided by a plurality of grooves 6 extending in the direction of movement of the recording medium 10 (in a direction perpendicular to the plane of FIG. 3) into conductive layer segments 5-1, 5-2, ... 5-n which are n in number (n is a positive integer) and in the form of strips extending in the direction of movement of the recording medium 10. At the bottom of each groove 6, the insulating base 4 is exposed, and the conductive layer segments 5-1, 5-2, ... 5-n are separated from each other by the grooves 6 and arranged parallel to each other and spaced in the direction in which recording electrodes N (See FIG. 4) are aligned with each other. Each of the conductive layer segments 5-1, 5-2, ... 5-n includes a plurality of conductive portions 7 arranged in the direction of movement of the recording medium 10 and extending through the insulating base 4 to be exposed to the underside of the base 4. The conductive portions 7 of each conductive layer segment are adapted to be maintained in contact with one of complementary electrodes $G_1, G_2 ... G_n$ (See FIG. 4) during the movement of the recording medium 10. For example, the conductive portions 7 may be equidistantly separated from each other and aligned with each other in the direction of movement, so that some of the conductive portions 7 of one conductive layer segment will be in contact with one of the complementary electrodes G at all times during the movement of the member 10 in a direction perpendicular to the plane of FIG. 3. Alternatively, a plurality of conductive webs 8 each associated with one of the conductive layer segments 5-1, 5-2 ... 5-n may be provided to the underside of the base 4 so that the end of the conductive portion 7 of each conductive layer segment 5-1, 5-2 ... 5-n may be brought into contact with one of the complementary electrodes $G_1, G_2 ... G_n$ at all times through the associated conductive web 8. In any case, in order to obtain good contact between the conductive portions 7 and the associated complementary electrodes G, it is advantageous that the end of each conductive portion 7 or each conductive web 8 have as large a width as possible. In FIG. 3, the end of each conductive portion 7 is connected to a conductive web 8. Each web 8 has a width which is greater than the width of the conductive portions 7 but smaller than the width of the conductive layer segments 5-1, 5-2 ... 5-n.

The conductive support of the recording medium 10 constructed as aforementioned may be produced as follows. Firstly, the insulating base 4 is formed with through holes for permitting the conductive portions 7 of the conductive layer segments 5-1, 5-2 ... 5-n to extend therethrough, and then placed on a jig having a smooth surface made as of metal. Thereafter a surface activator, a conductive polymer or other known electrically conductive material is mixed with a solvent or a solution of a resin to produce a conductive paste which is applied to the surface of the perforated base 4. The conductive paste is levelled off with a leveller moved horizontally over the base 4 so as to form the conductive layer 5 over the entire area of the base 4 and the conductive portions 7 filling the holes formed in the base 4 beforehand. After the conductive paste has dried, it is straight scribed by a needle or knife edge to form the grooves in the conductive layer 5 to define the conductive layer segments 5-1, 5-2 ... 5-n. Meanwhile the conductive paste which was forced out of the through holes formed in the base 4 toward the underside are subjected to light grinding lightly. Thus the desired conductive support is produced. In the event that the conductive webs 8 are formed on the underside of the base 4, a mixture of a conductive material and a solvent or a solution of a resin is applied or attached by vaporization deposition in vacua to regions on the underside of the base 4 which correspond to the ends of the conductive portions 7 of the conductive layer segments. With these conductive webs 8, a good electric contact between the conductive segments and the complementary electrodes G will be secured, even in the case where the recording medium is repeatedly used in an electrostatic recording system of the toner image transfer printing type.

Figure 1:
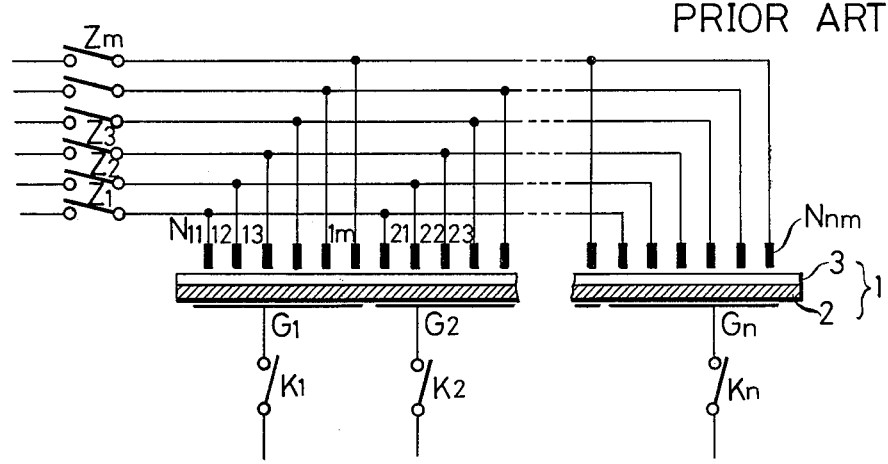
FIG. 1 is a diagrammatic showing of the arrangement of the recording electrodes complementary electrodes and circuit means connecting these electrodes of an electrostatic recording apparatus and of an electrostatic recording medium passing between the two types of electrodes.
Figure 4:
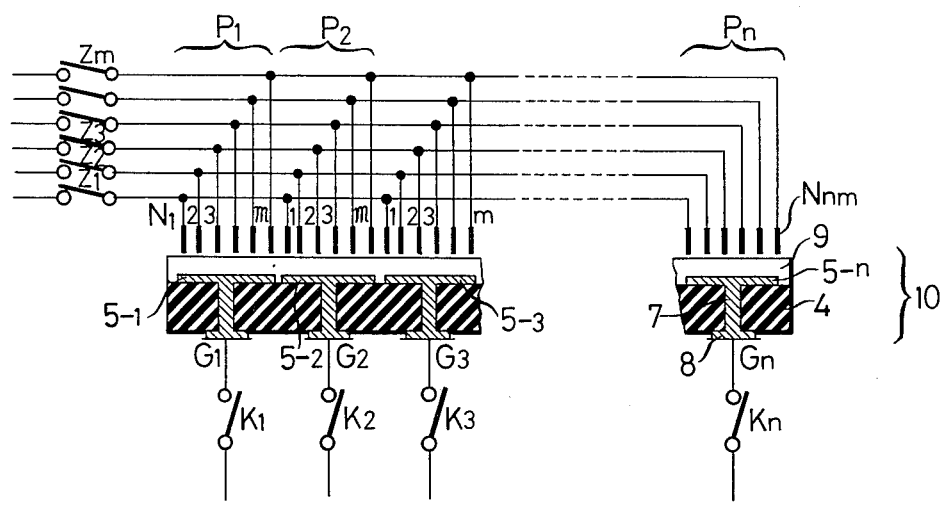
FIG. 4 is a diagrammatic showing of the arrangement of the recording electrodes complementary electrodes and circuit means connecting these electrodes of an electrostatic recording apparatus using the electrostatic recording medium shown in FIG. 3.

In FIG. 4, there is shown the recording medium 10 produced by attaching the dielectric layer 9 to the support, in relation to the recording electrodes N and the complementary electrodes G. The recording electrodes N and the complementary electrodes G are connected to a group of switches Z and a group of switches D respectively, in the same manner as the prior art arrangement shown in FIG. 1. Assume that switches $Z_1$ and $K_1$ are selectively closed and a voltage or impulse is impressed on the needle electrodes $N_{11}$, $N_{21}$ ... of the recording electrode arrays $P_1$ to $P_n$ respectively and a voltage or impulse is simultaneously impressed on the complementary electrode $G_1$. The voltage impressed on the complementary electrode $G_1$ is led through the conductive portion 7 to the conductive layer segment 5-1, so that an electric field of strength sufficiently high to produce a discharge is created only between the needle electrode $N_{11}$ and the conductive layer segment 5-1, and a discharge takes place between the conductive layer segment 5-1 and the needle electrode $N_{11}$. This electrically charges a region of the dielectric layer 9 interposed between the needle electrode $N_{11}$ and the conductive layer segment 5-1. A voltage is naturally impressed on the first needle electrodes $N_{21}$, $N_{31}$... $N_{n1}$ of other recording electrode arrays $P_2$, $P_3$... $P_n$ from the switch $Z_1$. However, since the conductive layer segment 5-1 is insulated by grooves 6 from the conductive layer segments 5-2, 5-3 ... 5-n associated with the recording electrode arrays P-2, P-3, ... P-n respectively, no discharge is produced by the needle electrodes $N_{21}$, $N_{31}$ ... $N_{n1}$. Thus, if the recording medium 10 in accordance with the invention is used, no ghost image phenomenon occurs even is recording is performed in an atmosphere of high humidity. In the recording medium 10 shown and described hereinabove, the needle electrodes which are m in number are required to be arranged opposite to each conductive layer segment. For this reason, the gap between the adjacent conductive layer segments or the groove 6 must have a width which is equal to or smaller than the spacing between the needle electrodes.

Figure 5:
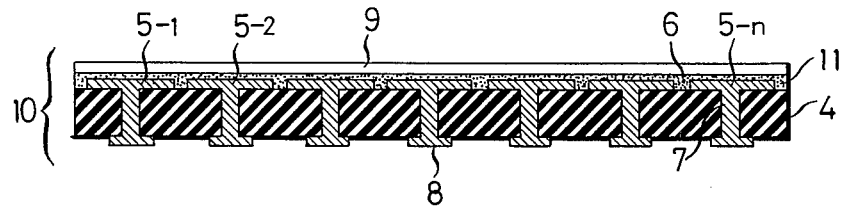
FIG. 5 is a diagrammatic showing of the electrostatic recording medium comprising another embodiment of the invention, shown in a sectional view similar to FIG. 3 but having an intermediate resistance layer interposed between the conductive support and the dielectric layer.

FIG. 5 shows another embodiment of the invention which differs from the embodiment shown in FIG. 3 in that an intermediate resistance layer 11 is interposed between the conductive layer 5 and the dielectric layer 9 of the electrostatic recording medium 10 shown in FIG. 5. As shown in a diagram in FIG. 6, the electrostatic recording medium 10 shown in FIG. 5 is used in the same manner as the embodiment shown in FIG. 3 is used. The intermediate resistance layer 11 may be formed by dispersing a known electrically conductive material (such as one of organic conductive materials including alkyl-phosphoric acid ester, quarternary ammonium salt polymer etc., or one of pigments of relatively high conductively including carbon black, electroconductive zinc oxide, titanium oxide, etc.) in an insulating high molecular substance (such as one of polycarbonates, polyesters, acrylic resins, polyurethane, styrene resins, betadiene resins alkyd resins, various types of cellulose, etc.) The material for the intermediate resistance layer 11 has a resistance value which is adjusted such that it has a volume resistivity in the range between $10^7$ and $10^{12}$ Ω cm, or preferably in the range between $10^8$ and $10^{10}$ Ω cm. If the volume resistivity is below $10^7$ Ω cm, the material has no effect in preventing electric short-circuiting, and if the volume resistivity is over $10^{12}$ Ω cm, the material would rather be termed dielectric. If a material of such high volume resistivity is used as the intermediate resistance layer 11, a high voltage must be impressed on the needle electrodes to electrically charge the dielectric layer.

The intermediate resistance layer 11 has a thickness in the range between 3 and 20 microns. The dielectric layer 9 has a thickness in the range between 2and 7 microns. Even if pin-holes are formed in the dielectric layer 9 when the latter is formed, the presence of the intermediate resistance layer 11 between the dielectric layer 9 and the conductive layer 5 precludes the occurences of electric short-circuiting. The electrostatic recording medium having the intermediate resistance layer 11 is as high in mechanical strength as the electrostatic recording medium having no such layer, and enables transfer-printed images of high quality free from a ghost image and defective reproduction to be obtained.

Figure 6:
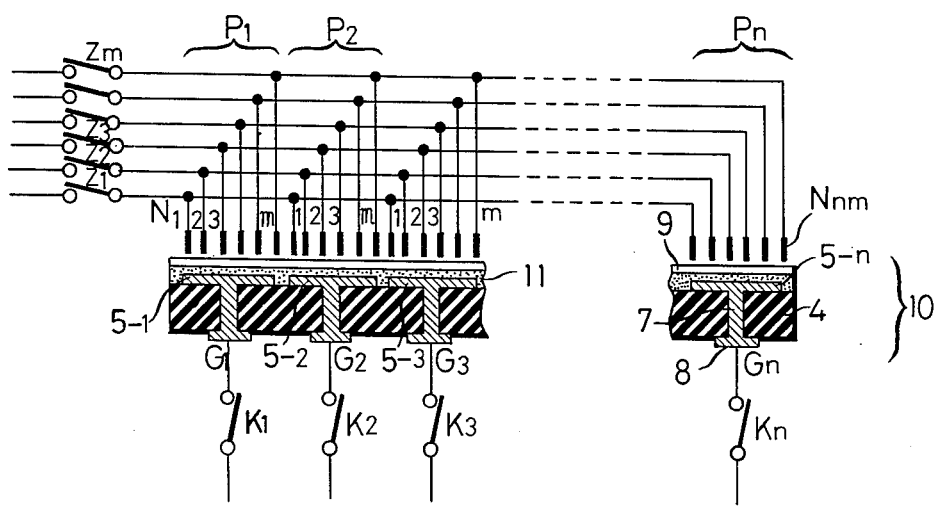
FIG. 6 is a diagrammatic showing of the electrostatic recording apparatus similar to FIG. 4 but using the electrostatic recording medium shown in FIG. 5.

In FIGS. 4 and 6, the recording electrode arrays $P_1$, $P_2$ ... $P_n$ are shown as being aligned with the conductive layer segments 5-1, 5-2, ... 5-n, respectively, of the conductive support. It is to be understood that this arrangement shows the typical arrangement of the recording electrode arrays and the corresponding segments of the conductive layer of the electrostatic recording medium in a system for eletrostatic recording of duplex control for controlling both the needle electrodes N and the complementary electrodes G. The invention is not limited to this arrangement of the recording electrode arrays and the conductive layer segments, and the recording electrode arrays may be arranged such that one of the recording electrode arrays straddles the adjacent two conductive layer segments.

The electrostatic recording medium 10 in accordance with the invention may be made into an endless belt either before or after the dielectric layer 9 alone or the intermediate layer 11 and the dielectric layer 11 are provided on the conductive support. Also, the medium 10 may be made in the form of a drum from the start. If the electrostatic recording medium 10 is either in the form of an endless belt or in the form of a drum, it can be advantageously used in apparatus wherein an electrostatic latent image formed on the recording medium is developed by means of a toner, a toner image is printed on a copy sheet by transfer printing, and the residual electrostatic image on the electrostatic recording medium is erased so as to repeatedly use the electrostatic recording medium. In repeatedly using the electrostatic recording medium in an electrostatic recording system of the toner image transfer printing type, it is necessary to erase the residual electrostatic image. This can be accomplished by subjecting the residual electrostatic image to an AC corona discharge or to a DC corona discharge of a polarity opposite to the polarity of the residual electrostatic image. Alternatively, a photoconductive material may be incorporated in the dielectric layer when the recording medium is prepared.

If this is the case, the residual electrostatic image can be erased by illuminating the image by light.

Since the electrostatic recording medium in accordance with the invention has an insulating base, it is suitable for use in an electrostatic recording system in which the recording medium is repeatedly used as aforementioned.

In the specification, a plurality of conductive portions of each conductive layer segment extend through the insulating base to be exposed to the underside of the base. It is to be understood that in this case the plurality of conductive portions 7 may be connected together as an entity which extends continuously in the direction of movement of the recording medium 10 or in a direction perpendicular to the plane of FIG. 3. It will be apparent that this form of conductive portion can achieve satisfactory results like other forms of conductive portions.

While specific embodiments of the invention have been shown and described in detail to illustrate the application of the principles of the invention, it will be understood that the invention may be embodied otherwise without departing from its principles.

What is claimed is:

1. An electrostatic recording medium for use with electrostatic recording apparatus comprising a plurality of recording electrode arrays spaced apart in juxtaposition to a plurality of complementary electrodes, said arrays comprising electrodes spaced apart across said medium from one edge of a recording area to the opposite edge of said area, first switching means selectively connecting like-numbered electrodes of said arrays to a first source of potential, and second switching means selectively connecting said complementary electrodes to a second source of potential to produce a limited electrostatic field in said medium in the region between the selected complementary electrode and the selected one of said like-numbered electrode juxtaposed with respect to said selected complementary electrode, said electrostatic recording medium comprising:
   an insulating resin base;
   a conductive layer on said insulating base, said conductive layer being divided into a plurality of elongated segments arranged side-by-side from said one edge to said opposite edge, each of said conductive layer segments being electrically separated from adjacent said segments;
   a plurality of conductive portions extending through said base and exposed at the underside thereof to be brought into contact, selectively, with a respective one of the complementary electrodes, each of said conductive portions being electrically connected on the other side of said base with a respective one of said segments, whereby said conductive portions selectively connect said complementary electrodes to said elongated segments; and
   a dielectric layer on said conductive layer.

2. An electrostatic recording medium, as claimed in claim 1, comprising a plurality of said conductive portions arranged substantially equidistantly in a row aligned with, and making connection with, a respective one of said conductive layer segments, there being at least one such row for each of said segments, and each of said rows extending in the direction of movement of said electrostatic recording medium in the space between said electrode arrays and said complementary electrodes.

3. An electrostatic recording medium, as claimed in claim 1, further comprising a plurality of conductive webs equal in number to said conductive segments and attached to the underside of said insulating base of said recording medium, each of said webs being connected to at least one of said conductive portions to be connected thereby to a respective one of said conductive segments, each of said webs being electrically isolated from any other of said conductive portions connected to a different one of said conductive segments.

4. An electrostatic recording medium as claimed in claim 1, further comprising an intermediate resistance layer interposed between said conductive layer and said dielectric layer.

5. An electrostatic recording medium as claimed in claim 4, wherein said intermediate resistance layer is adjusted such that its volume resistivity is in the range between $10^7$ and $10^{12}$ $\Omega$ cm.

6. An electrostatic recording medium for electrostatic recording apparatus having a plurality of recording electrodes arranged into a plurality of recording electrode arrays wherein one recording electrode from each recording electrode array is connected in common to one of a plurality of common switches and each recording electrode array is associated with a complementary electrode for recording an impulse on the recording medium when the impulse is selectively applied to one of the common switches and one associated complementary electrode, comprising, an insulating resin base, a plurality of conductive layer segments on said insulating resin base each associatable with at least one of said recording electrode arrays and with said associated complementary electrode of said one array wherein said conductive segments are spaced apart and electrically isolated from each other on said base, for recording the impulse on the recording medium only in the vicinity of the one complementary electrode selected, and a dielectric layer on said insulating resin base overlaying said conductive layer segments.

7. An electrostatic recording medium according to claim 6, wherein said recording medium is moveable in a selected direction past the plurality of recording electrodes, said conductive layer segments are arranged in spaced bands along said insulating resin base in the direction of its motion and each of said conductive layer segments includes at least one conductive portion extending downwardly through said insulative base and terminating at the underside of said insulative base whereby said conductive layer segments are closely associatable with said recording electrode arrays and said complementary electrodes are closely associated with the end of said conductive portion terminated at the underside of said insulating resin base.

8. An electrostatic recording medium according to claim 7, further including a web portion connected to each conductive portion respectively adjacent the underside of said insulative resin base and extending parallel to said conductive layer segments.

9. An electrostatic recording medium according to claim 6, further including a resistance layer disposed between said conductive layer segments with said insulating resin base, and said dielectric layer.

10. An electrostatic recording medium according to claim 9, wherein said resistance layer has a volume resistivity in the range of between about $10^7$ and $10^{12}$ ohm cm.

11. An electrostatic recording medium according to claim 10 wherein said resistance layer is between about 3 and 20 microns in thickness.

12. An electrostatic recording medium according to claim 10 wherein said dielectric layer is between about 2 and 7 microns in thickness.

* * * * *